United States Patent [19]

Franklin et al.

[11] 4,363,138

[45] Dec. 7, 1982

[54] SIGNAL PRESENCE DETECTOR AND METHOD

[75] Inventors: Sidney B. Franklin, Rancho Palos Verdes; Arthur Garabedian, Manhattan Beach; Curtis S. Hoffman; Marshall Y. Huang, both of Rancho Palos Verdes, all of Calif.; Robert B. Marcum, West Carrollton, Ohio

[73] Assignee: TRW Inc., Redondo Beach, Calif.

[21] Appl. No.: 964,127

[22] Filed: Nov. 27, 1978

[51] Int. Cl.³ .................. H04B 17/00; H04B 1/10
[52] U.S. Cl. .................... 455/226; 455/67; 455/296; 364/485
[58] Field of Search ............ 325/472, 473, 474, 475, 325/476, 477, 377, 378, 379, 388, 436, 437; 328/167; 179/1 P; 364/581, 481, 485; 455/283, 286, 295, 296, 303, 304, 307, 226, 214, 135, 67

[56] References Cited

U.S. PATENT DOCUMENTS

| | | | |
|---|---|---|---|
| 3,173,087 | 3/1965 | Loposer | 455/226 |
| 3,737,781 | 6/1973 | Deerkoski | 364/581 |
| 3,988,679 | 10/1976 | Clarke et al. | 325/473 |
| 4,034,299 | 7/1977 | Cho | 455/226 |
| 4,039,953 | 8/1977 | Chadwick | 325/474 |
| 4,125,809 | 11/1978 | Mott | 364/481 |

*Primary Examiner*—Tommy P. Chin
*Attorney, Agent, or Firm*—Fraser and Bogucki

[57] ABSTRACT

Circuitry and methods are presented for detecting the presence of a spectrally distributed signal having a known distribution, e.g. spread spectrum, in a strong noise environment. The signal is split into two channels, each filtering a predetermined frequency band within the given spectrum. The channels are tuned and balanced so that they pass differential amounts of signal energy that may be present but provide equalized noise outputs. The channels are alternately coupled to the input of an energy detector which provides a DC component responsive to the difference in the signal levels of interest, while effectively cancelling noise energy components in each channel. In the spread spectrum example the frequency bands are typically selected to the maximum and a null location in a $$\left(\frac{\sin x}{x}\right)^2$$

distribution.

15 Claims, 4 Drawing Figures

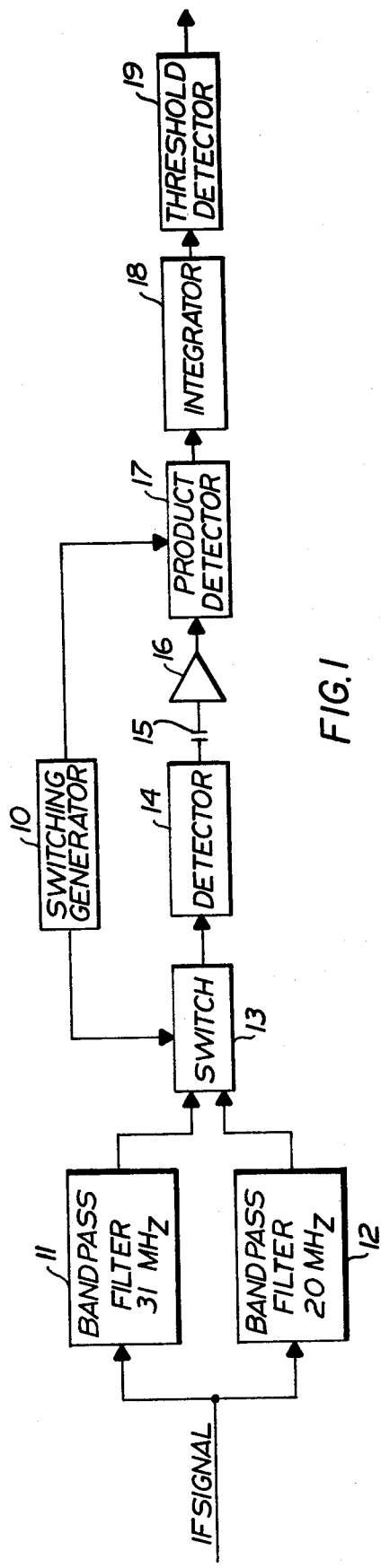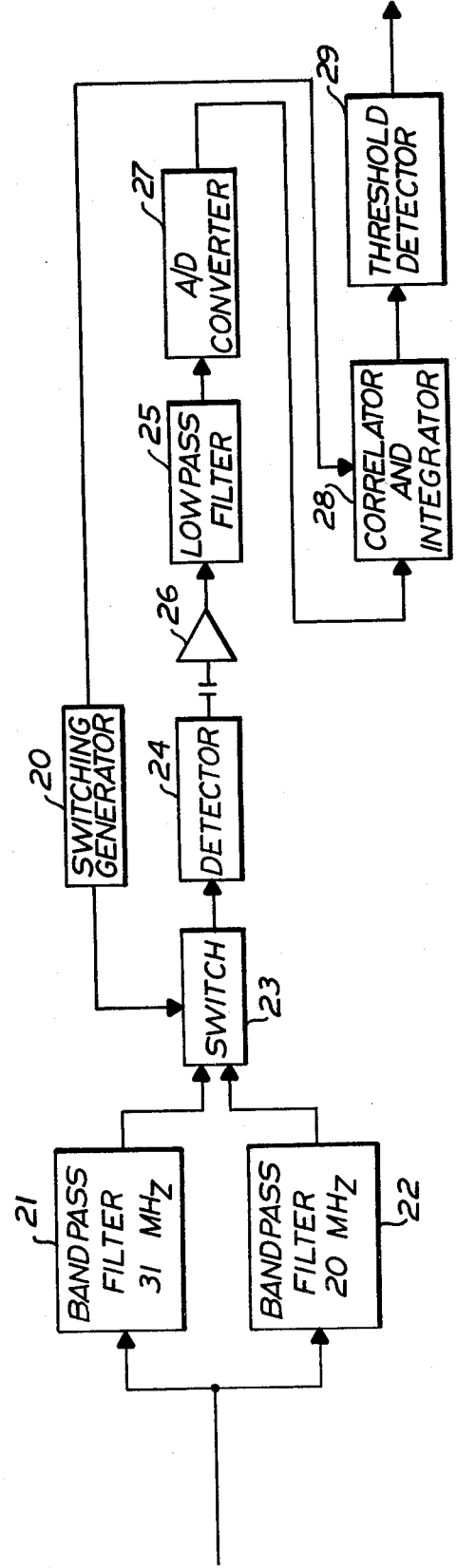

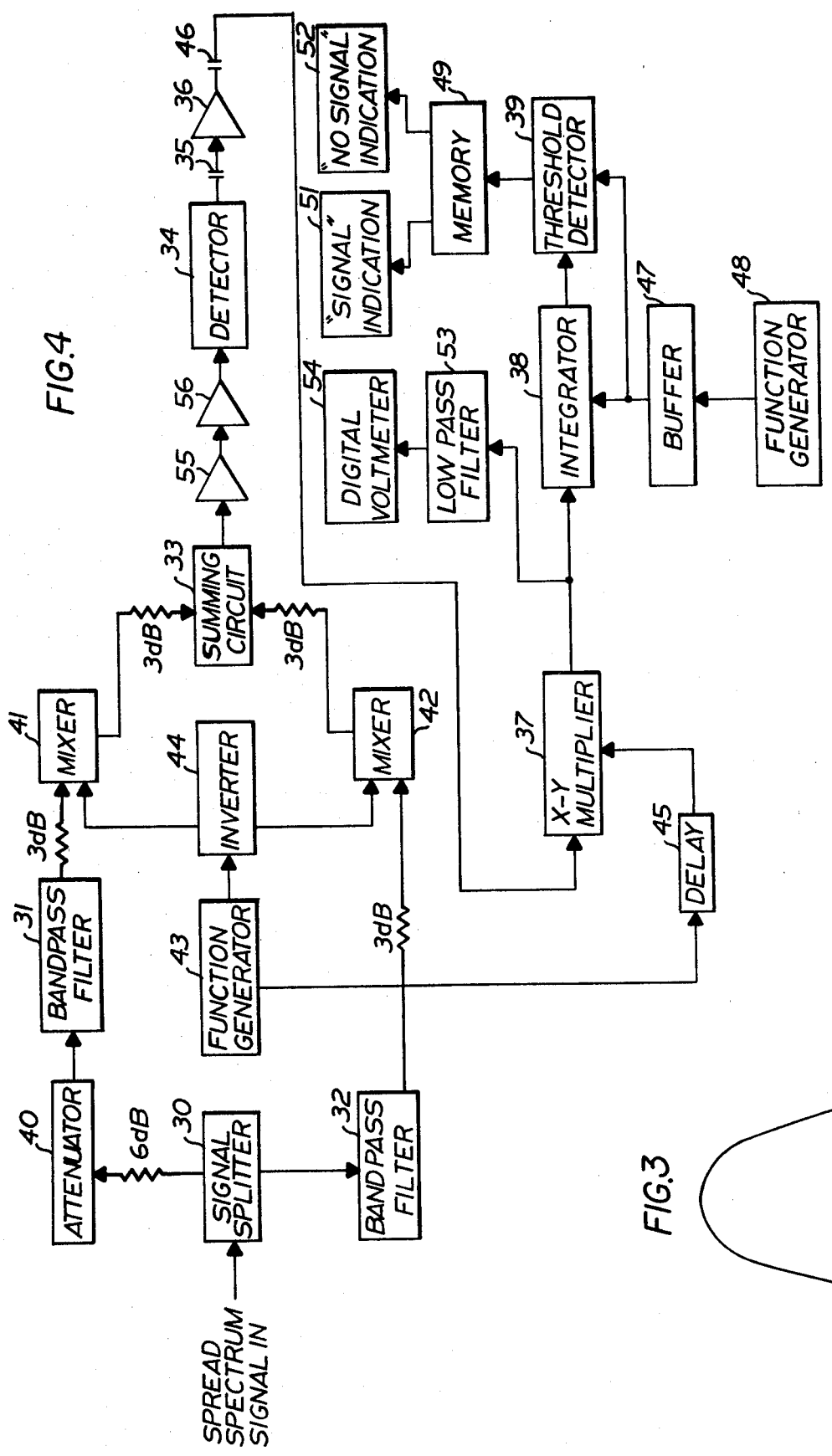

SIGNAL PRESENCE DETECTOR AND METHOD

BACKGROUND OF THE INVENTION

Modern technology has created a demand for reliable communications systems requiring relatively low power usage but having the ability to span great distances. This has been accomplished in many communication systems by utilizing relatively narrow bandwidths and antenna systems which are highly directional. This permits high signal density to be achieved but creates other difficulties, in that transmitting and receiving antennas must be precisely aligned for reliable communication to occur. Thus, the system must detect the presence of the signal and initially align the antennas.

In many instances, the signal transmitted is of the direct sequence spread spectrum type, which has a known $$\left(\frac{\sin x}{x}\right)^2$$

characteristic, with signal energy distributed over a wider frequency band and having a maximum amplitude at the central frequency and dimenishing side peaks separated by null points. This is merely one example of the type of system in which a known instantaneous spectral distribution exists, and in which the presence of the signal must be affirmatively identified. A particular problem encountered in the modern state of the art is that the noise energy within the receiver bandwidth may be substantially greater than the signal energy. It may, for example, be desired to detect a signal which is only 20% of the amplitude of the noise, so that the IF signal-to-noise ratio is negative, and as low as $-7$ db. This condition can readily arise when receiver and transmitter stations are in constant movement relative to each other, at a substantial spatial separation, and with their respective antennas scanning through a conical uncertainty region attempting to acquire each other. It is usually necessary to effect acquisition when the narrow beam antennas are not in direct alignment and when the signal to noise ratio is negative, expressed in decibels. Because the system is constrained to use the predetermined bandwidth of the communication signal, the problem of identifying the signal presence in the attendant noise becomes even more severe.

Numerous prior art systems have been developed to determine the presence of a signal in a highly noisy environment. Many of the techniques developed have been highly successful but none can cope with the handicap placed on the system when the signal is a spread spectrum signal. For instance, in Freedman U.S. Pat. No. 3,605,029 on "Signal Detection Apparatus" issued Sept. 14, 1971 the concept is disclosed of a receiver for use in a system in which randomly varying target indicating signals from a transducer are detected in the presence of noisy signals which vary in amplitude between wide limits. The approach of Freedman is to apply the signal through parallel channels each having a band pass filter of a different frequency and demodulating the output of each filter to produce signals which can be compared to provide the difference between the root mean square value of the noise signal and the target indicating signal. This system functions satisfactoily when a reasonable signal-to-noise ratio exists but when the received signal has the spread spectrum characteristic and the signal-to-noise ratio becomes negative, the system cannot provide an indication of the presence of a signal due to variations in circuitry components and the resultant variations in detector characteristics.

J. Kubanoff, U.S. Pat. No. 3,605,012 on "Noise Cancellation Filter System" issued Sept. 14, 1971 is similar to the Freedman system in that it splits the signal into two channels and each channel incorporates a filter responsive to a different frequency. In Kubanoff, the outputs of the filters are integrated and then summed as in Freedman to provide an output indicative of the presence of a signal as indicated by the difference between the signal-to-noise amplitudes. This system suffers from the same deficiencies as Freedman in the presence of a spread spectrum signal because the very low signal-to-noise ratios result in the signal being masked by the variations in channel response.

Other techniques utilized in attempts to isolate a signal in the presence of noise which have proved satisfactory in various environments but cannot cope with spread spectrum problems of very low signal-to-noise ratio include Webb, U.S. Pat. No. 3,350,643, on "Signal-To-Noise Ratio Estimating by Taking Ratio of Mean and Standard Deviation of Integrated Signal Samples" issued Oct. 31, 1967 wherein a carrier and subcarrier are demodulated to provide outputs that are integrated, converted from analog-to-digital signals and applied to a computer means which produces a ratio. This system has functioned satisfactorily for space vehicle communications but fails to provide an adequate response when spread spectrum problems occur reducing the signal-to-noise ratio below the sensitivity of the analog-to-digital converters and computer means incorporated by the system.

L. Deerkoski, U.S. Pat. No. 3,737,781 on "Signal-To-Noise Ratio Determination Circuit" issued June 5, 1973 is a still further example of prior techniques utilized to identify the presence of a signal by producing an output which is a function of the difference between the noise signal and the signal plus noise. However, this system cannot cope with the spread spectrum problem due to the relatively low signal-to-noise ratios encountered.

H. Brendzel et al, U.S. Pat. No. 3,855,423 on "Noise Spectrum Equalizer" issued Dec. 17, 1974; Campbell, U.S. Pat. No. 3,821,482 on "Noise Spectrum Equalizer Utilizing Spectrum Inversion" issued June 28, 1974; and O'Connor, U.S. Pat. No. 3,611,145 issued Oct. 5, 1971 are examples of techniques utilized to overcome noise problems by various equalization techniques which work satisfactorily in most environments but fail to provide the type of response required to accurately indicate the presence of a signal when the signal-to-noise ratio is in the range of only a few percent as is experienced in the spread spectrum signal environment.

SUMMARY OF THE INVENTION

Signal presence detectors and methods according to the invention switch between two frequency regions of a signal bandwidth in which there is a known differential between the signal energies. The total energy derived in each frequency region includes substantially greater noise than signal, but the noise contributions are initially balanced so that the presence of a signal creates a discernible differential in the total signal energies in the two regions. The differential is measured after signal detection and if adequate the presence of a signal is indicated.

In a specific example of a spread spectrum system, a reference signal is derived which is inherently matched to the noise level in the signal portion of the IF bandwidth by comparing the energy in the center of the received signal spectrum to the energy in a narrow portion of the spectrum centered at a null in the received signal band. The two frequency bands of the received signal are isolated by narrow band filters that are alternately switched to a single envelo0e or square-law detector. When no signal is present, the average energy passing through the two filters represents noise power in each position of the spectrum so that by proper calibration, the noise powers can be made equal. Thus when a signal is present, along with the noise, the energy passing through one filter increases while the energy increase in the second filter remains negligible. In this example, detected outputs are derived that are functions of the signal plus noise power and noise alone power, respectively. These detected outputs are processed in time-shared fashion in a single output channel to provide a product signal that is a measure of the differential between the total energy passing through each filter. The output signal may be integrated and applied to a threshold detector to minimize false alarm probabilities.

DESCRIPTION OF THE DRAWINGS

FIG. 1 is a block diagram of an example of the present invention utilizing analog techniques;

FIG. 2 is a block diagram of an example of the present invention utilizing digital techniques;

FIG. 3 represents a typical received signal spectrum for a signal having a spread spectrum characteristic; and, FIG. 4 is a combined block diagram and simplified schematic of a more specific example of a system in accordance with the present invention.

DESCRIPTION OF THE INVENTION

FIG. 1 illustrates the primary elements of a system in accordance with the present invention in an example utilizing analog techniques. For illustrative purposes, the system is presented as processing a 31 MHz IF signal which has been spread with an 11 MHz pseudonoise (PN) code, but is should be understood that the teachings presented are applicable to all frequency ranges. The spread spectrum signal has the known $$\left(\frac{\sin x}{x}\right)^2$$

characteristic of FIG. 3 which inherently restricts the signal-to-noise ratio that can be achieved with a particular power level of transmission. However, for a given signal of this characteristic the central frequency and the null points are known. For instance, FIG. 3 illustrates a typical received signal spectrum having a center frequency of 31 MHz with first nodes at 20 MHz and 42 MHz.

In the spread spectrum system of FIG. 1, the 31 MHz IF signal is divided and applied to a first channel 11 and a second channel 12, each of which incorporates a band pass filter. The range of the band pass filters is selected as a function of the typical received signal spectrum and in this example peak and null values are taken for maximum amplitude differential. Thus channel 11 of FIG. 1 incorporates a band pass filter tuned to the center frequency or 31 MHz and the second channel 12 incorporates a filter tuned to the lower first null of the signal spectrum or 20 MHz. The higher null point could be chosen as well, and precise peak and null locations are not required for most applications. While maximum amplitude difference between the signals in the two channels is sometimes preferable or required, other relationships for the frequency bands within the signal spectrum can be selected. For example, if one band were located on the side slope of the $$\left(\frac{\sin x}{x}\right)^2$$

curve, the resultant variations would enable the sense of frequency deviations to be identified for tracking purposes. As another example, the channels might be arranged to have a common center frequency but different bandwidths, so that less signal energy is present in the narrower band.

The outputs of channels 11 and 12 are coupled via a single-pole double-throw switch means 13 to a power detector 14. Switch 13 functions to alternately apply the output of the center band channel 11 and the first null channel 12 to the power detector 14. The two channels include means (not shown in this example) to balance the channel outputs in the presence of noise but the absence of a signal. Capacitor 15 provides DC isolation in this example between detector 14 and an AC amplifier 16 which drives a product detector 17. However, an AC coupling is not required inasmuch as the signals could be switched to different inputs of a differential amplifier. The product detector 17 and switch means 13 are both synchronized through the switching generator 10 which causes the alternate application of the outputs of the two bandpass filters to the detector 14. The output of the product detector 17 is summed by integrator 18 to provide a DC level to a threshold detector 19 which provides an output signal indicative of the presence or absence of the spread spectrum signal in this example.

In the operation of the system of FIG. 1, channels are first balanced for noise alone reception. This is done, for example, by using variable attenuators (not shown in FIG. 1) in each channel, and by adjusting the attenuator values until the mean value of the output of the integrator 18 is brought to zero under the noise alone condition. The system then constantly attempts to ascertain whether a meaningful signal component is present in the received spread spectrum signal, by comparing the amplitudes of the total signals received from the two bandpass filters 11, 12 in the different channels. Concurrent with the switching between channels effected by the switching generator 10, the alternative signal samples from the different channels are passed through the detector 14 for comparison in the product detector 17. By using a multiplication function in the product detector 17, a relatively small difference in input energy results in a significant output signal and the summation of this signal in the integrator 18 assures against erroneous variations due to random noise. The signal in each of the channels, under the stated conditions of a negative signal-to-noise ratio, is predominantly noise energy. However, with a signal of relatively narrow bandwidth, the noise energy is substantially the same, over practical time averaging intervals, in both of the chosen bands within the total bandwidth of the spread spectrum signal. Concurrently the common output channel processes the detected signal energy in both bands without introducing offsets or drifts. Consequently, when a faint signal is present, the energy contribution to the total signal adds a small but significant component, which is discernible despite the relatively higher absolute amplitude of noise. By setting the threshold detector 19 at an appropriate level determined by the circumstances, as is well known to those skilled in the art, the presence of the spread spectrum signal can thereby be identified. The system thus enables signals transmitted with relatively low power between narrow band transmitting and receiving antennas scanning through a conical uncertainty region to identify the presence of the desired signal so that the system may thereafter lock on for data communications.

It will be appreciated that various other techniques may be utilized to achieve initial balancing of the received signals in the two channels. For example, variable gain amplifiers may be used instead of variable attenuators. While, ideally, it is preferable to achieve balance between the two channels using symmetrical operating characteristics, in practice satisfactory results are usually achieved by other adjustments as well. Thus it is readily feasible to achieve balance by varying the duty cycle of the switch 13 so as to increase the energy from a channel providing less output.

The arrangement of FIG. 2 is similar to that of FIG. 1 except that it incorporates digital techniques. Note that in the example a 31 MHz IF signal is applied to a 31 MHz bandpass filter channel 21 and a 20 MHz bandpass filter channel 22 and that the outputs of both channels are applied through a switch 23 to a detector 24 in a manner identical to that suggested for FIG. 1. The output of the power detector 24 is coupled to an amplifier 26 and the amplified output is passed through a low pass filter 25 and converted to an equivalent digital representation by analog-to-digital converter 27. This digital representation is then summed by the digital correlator and integrator 28, with successive samples from the two channels being synchronized with the switch 23 operation via the switching generator 20. The correlator portion of the circuit effectively provides a multiplication function corresponding that of the arrangement of FIG. 1, while the digital integrator portion accumulates values from successive samples as previously described. The output of the correlator and integrator 28 is applied to a threshold detector 29 which produces a signal representative of the presence or absence of a signal in the IF input.

Conversion of signals to the digital format involves greater circuit complexity, but with modern integrated circuit technology can be effected at low cost and with very low power consumption. Further, it affords substantially greater versatility in signal processing. If desired, the AC coupling technique shown in FIG. 2 can be replaced by a sample and hold circuit which feeds the analog-to-digital converter, and the comparison between signals from the two channels can be made by reversing the sign of the digital values from one of the channels before applying the digital values to an accumulator.

FIG. 4 illustrates a more detailed example of a preferred embodiment of the spread spectrum signal presence detector adapted to function with an input signal spectrum having a center frequency of 98.76 MHz and a spectrum null 11.23 MHz from the center frequency of 110 MHz.

The spread spectrum signal input in FIG. 4 is applied to a signal splitter 30 which in the preferred embodiment is a type MCL ZSC-2-1. It provides one input through a 6 DB attenuator to a 0-10 DB variable attenuator 40 such as a Weinschel No. 905. The output of attenuator 40 is applied to bandpass filter 31 which has a center frequency of 98.768 MHz and a bandwidth of 4 MHz. A suitable bandpass filter is manufactured by Telonic and identified by their No. TTF72-5-5EE. The output of bandpass filter 31 is applied through a 3 DB attenuator to the balanced mixer 41 which provides an input to summing means 33 via a 3 DB attenuator. Balanced mixer 41 is an MCL SRA-3 mixer in the preferred embodiment and the summing means is an MCL PSC-2-1.

The second output of splitter 30 is applied to bandpass filter 32 which has a center frequency of 110 MHz and a bandwidth of 0.75 MHz. A suitable bandpass filter for this application is manufactured by Texscan and identified by their No. 5BC110/0.750-NN. The output of bandpass filter 32 is applied through a 3 DB attenuator to balanced mixer 42 which is identical in type to balance mixer 41. The output of balanced mixer 42 is applied through a 3 DB attenuator to the second input of summing means 33.

Balanced mixers 41 and 42 function as switching means in response to alternating inputs from inverter/buffer 44. The inverter/buffer 44 couples the output of function generator 43 to the balanced mixers 41 and 42 in such a way that the signals at the two mixers are 180° out of phase. The function generator incorporated in the preferred embodiment is manufactured by Interstate and identified by their No. PG-31.

The output of summing means 33 is applied to an amplifier 55 which is a UTO521 and its output is applied to a second amplifier 56 which is a UTO502. The cascading of amplifiers 55 and 56 creates a 40 DB gain in the output of summing means 33 and this amplified signal is applied to envelope detector 34 which is a square-law detector.

The output of square-law detector 34 is coupled via capacitor 35 to AC amplifier 36 which is an HA-2520 amplifier capable of producing a gain of 40 DB. The output of amplifier 36 is coupled to X-Y multiplier 37 by capacitor 46. The X-Y multiplier 37 is an AD-532JD multiplier which coherently multiplies the time gated mixer 41 and 42 outputs by plus one or minus one respectively thus effectively inverting one of the detected outputs. The synchronization between the balanced mixers and multiplier 37 is provided by the interconnection between the three stages of the system with function generator 43. A delay means 45 is incorporated between the function generator 43 and X-Y multiplier 37 to compensate for signal processing time between the balanced mixers and the multiplier.

A digital voltmeter 54 may be connected to the output of X-Y multiplier 37 by a low pass filter 53 to provide a monitoring means for the signal level.

The output of X-Y multiplier 37 is applied to an integrate and dump circuit 38 which is an LM108 operational amplifier adapted to integrate the output of X-Y multiplier 37 and dump the integrated voltage as an output to threshold detector 39 in response to function generator 48 which is coupled to both the integrator 38 and detector 39 by buffer 47. In the preferred embodiment illustrated in FIG. 4, function generator 48 is an HP3310B and the threshold detector is an LM111 voltage comparator.

The output of the threshold detector 39 is applied to a memory means 49 which controls the illumination of a signal light 51 or a "no signal" light 52. Memory means 49 may be a simple latching or switching system which stays in the "no signal" position except when an output is provided by threshold detector 39.

In the arrangement of FIG. 4, it can be seen that a versatile system is provided in which calibration, signal adjustment and signal balancing are incorporated. It is feasible with this arrangement to adjust the integration time relative to the threshold level selected, so as to achieve preferred detection conditions. In addition, AC coupling and amplification prior to the multiplier assists in detection by minimizing the effects of thermal drifts that tend to dominate the signal at signal-to-noise ratios below about −10 DB.

While various examples of the invention have been illustrated and described, variations and modifications may be apparent to those skilled in the art. Therefore, we do not wish to be limited thereto and ask that the scope and breadth of this invention be determined from the claims which follow rather than the above description.

What is claimed is:

1. A signal presence detector for an input signal having a known spectral distribution but accompanied by strong noise energy which may provide a negative signal-to-noise ratio, comprising:
   a common input for receiving the input signal;
   a first bandpass filter coupled to the common input and responsive to the input signal, the first bandpass filter encompassing one selected region within the spectral distribution;
   a second bandpass filter coupled to the common input and responsive to the input signal, the second bandpass filter encompassing a second selected region within the spectral distribution;
   a detector;
   switching means for applying the outputs of said first and second bandpass filters to said detector in time shared fashion; and
   means coupled to said detector and responsive to received energy levels from said bandpass filters which differ by at least a predetermined minimum amount for indicating the presence of the input signal;
   the first and second bandpass filters having center frequencies lying at different regions within the spectral distribution, the signal having a spread spectrum characteristic and the center frequency of said first bandpass filter being at the center frequency of the spread spectrum.

2. A signal presence detector as set forth in claim 1 above, wherein the center frequency of said second bandpass filter is at a null frequency point of the spread spectrum.

3. A signal presence detector for an input signal having a known spectral distribution but accompanied by strong noise energy which may provide a negative signal-to-noise ratio, comprising:
   a common input for receiving the input signal;
   a first bandpass filter coupled to the common input and responsive to the input signal, the first bandpass filter encompassing one selected region within the spectral distribution;
   a second bandpass filter coupled to the common input and responsive to the input signal, the second bandpass filter encompassing a second selected region within the spectral distribution;
   a detector;
   switching means for applying the outputs of said first and second bandpass filters to said detector in time shared fashion;
   means coupled to said detector and responsive to received energy levels from said bandpass filters which differ by at least a predetermined minimum amount for indicating the presence of the input signal; and
   means coupled to at least one of said first and second bandpass filters for balancing the outputs of the filters when the inputs thereto are noise energy alone.

4. A signal presence detector as set forth in claim 3 above, wherein the first and second bandpass filters have like center frequencies and different bandwidths.

5. A signal presence detector as set forth in claim 3 above, wherein said detector comprises:
   multiplier means coupled to said detector means for providing the product of the two detected outputs from the bandpass filter means, the multiplier means being responsive to said switching means.

6. A signal presence detector as set forth in claim 5 above, including in addition an integrator coupled to the output of said multiplier means, and a threshold detector coupled to said integrator.

7. A signal presence detector for a signal having a known spectral distribution and accompanied by substantial noise comprising:
   means responsive to the signal for dividing the signal into two channels;
   a first bandpass filter responsive to a first channel and having a center frequency lying within the spectral distribution;
   a second bandpass filter responsive to the second channel and having a center frequency different from said first bandpass filter and within the spectral distribution;
   a power detector;
   switching means for mutually exclusively applying first one and then the other of the outputs of said first and said second bandpass filters to said power detector; and
   means coupled to said power detector and responsive to the existence of different energy levels in the two channels which differ by at least a predetermined minimum amount for indicating the presence of the signal;
   the signal having a spread spectrum characteristic and the center frequency of said first bandpass filter being equal to the center frequency of the spread spectrum.

8. A signal presence detector as set forth in claim 7 wherein the center frequency of said second bandpass filter is equal to the frequency of a first null of the spread spectrum.

9. A signal presence detector for a signal having a known spectral distribution and accompanied by substantial noise comprising:
   means responsive to the signal for dividing the signal into two channels;
   a first bandpass filter responsive to a first channel and having a center frequency lying within the spectral distribution;

a second bandpass filter responsive to the second channel and having a center frequency different from said first bandpass filter and within the spectral distribution;

a detector;

switching means to mutually exclusively apply the outputs of said first and said second bandpass filters to said detector; and means coupled to said detector and responsive to the existence of different energy levels in the two channels for indicating the presence of the signal;

said switching means comprising:

switching control means;

summing means providing an output to said detector under control of said switching control means;

a first mixer responsive to said first bandpass filter and said switching control means for providing an input to said summing means; and a second mixer responsive to said second bandpass filter and said switching control means for providing an input to said summing means.

10. A signal presence detector as set forth in claim 9 above further including:

X-Y multiplier means responsive to the output of said detector and responsive to said switching control means to provide the product of time shared signals from the two channels.

11. A signal presence detector as set forth in claim 10 further including amplifier means coupling the output from said detector to said X-Y multiplier;

integrating means responsive to said X-Y multiplier;

a threshold detector; and means coupling said integrating means to said threshold detector.

12. A signal presence detector as set forth in claim 11 above including in addition:

signal and no-signal indication means responsive to said threshold detector;

variable attenuator means coupled between said means for dividing the signal and said first bandpass filter;

signal delay means between said switching control means and said X-Y multiplier; and volt meter means responsive to the output of said X-Y multiplier.

13. The method of detecting the presence of a spread spectrum signal having a spread spectrum characteristic having a center frequency comprising the steps of:

balancing noise energy derived in two different frequency bands within the spread spectrum characteristic of the signal, the frequency bands being chosen to have a determinable relative difference in energy of the signal within the two different frequency bands and so that a first one of the two different frequency bands has a center frequency at the center frequency of the spread spectrum characteristic and a second one of the two different frequency bands has a center frequency at a different region within the spread spectrum characteristic from the center frequency of the first one of the two different frequency bands;

filtering the signal in the two different frequency bands;

successively sampling total energy, including noise energy, present in the two different frequency bands upon filtering the signal; and ascertaining the presence of the spread spectrum signal by the existence of an energy difference in excess of a predetermined amount in the two different frequency bands.

14. The method as set forth in claim 13 above, wherein the second one of the two different frequency bands encompasses a null point in the band of the spread spectrum signal.

15. The method as set forth in claim 13 above, wherein the step of ascertaining the presence includes the steps of determining the difference in total energy successively sampled in the two different frequency bands, integrating the determined difference and threshold detecting the integrated determined difference to provide an output representative of the presence of the signal.

* * * * *